United States Patent
Watanabe et al.

(10) Patent No.: US 6,684,735 B2
(45) Date of Patent: Feb. 3, 2004

(54) TORSIONAL DAMPER

(75) Inventors: Hideaki Watanabe, Ageo (JP); Takashi Yoshida, Ageo (JP)

(73) Assignee: Fukoku Co., Ltd., Saitama (JP)

( * ) Notice: Subject to any disclaimer, the term of this patent is extended or adjusted under 35 U.S.C. 154(b) by 0 days.

(21) Appl. No.: 10/093,719

(22) Filed: Mar. 7, 2002

(65) Prior Publication Data

US 2002/0129675 A1 Sep. 19, 2002

(30) Foreign Application Priority Data

Mar. 13, 2001 (JP) ........................................ 2001-120371

(51) Int. Cl.$^7$ ............................................... F16F 15/10
(52) U.S. Cl. .......................... 74/574; 74/572; 428/450; 428/462
(58) Field of Search ..................... 74/572–574; 428/450, 428/462

(56) References Cited

U.S. PATENT DOCUMENTS

| | | | |
|---|---|---|---|
| 4,794,816 A | * 1/1989 | Serizawa et al. ............. 74/574 |
| 4,962,677 A | * 10/1990 | Withers ........................ 74/574 |
| 2003/0035966 A1 | * 2/2003 | Tagawa et al. ............. 428/450 |

FOREIGN PATENT DOCUMENTS

| | | | | |
|---|---|---|---|---|
| GB | 2162611 A | * 2/1986 | ............... 74/573 R |
| JP | 8-74934 | * 3/1996 | ................... 74/574 |
| JP | 8-277885 | * 10/1996 | ................... 74/574 |
| JP | 9-310736 | * 12/1997 | ................... 74/574 |
| JP | 10-141440 | * 5/1998 | ................... 74/574 |
| JP | 10-159903 | * 6/1998 | ................... 74/574 |

* cited by examiner

*Primary Examiner*—Vinh T. Luong
(74) *Attorney, Agent, or Firm*—McCormick, Paulding & Huber LLP

(57) ABSTRACT

A torsional damper mounted to a crank shaft of an internal combustion engine has a hub provided with a rim portion and a fixing portion, and a boss welded to the rim portion. A mass body is arranged in an outer side of the rim portion via a cylindrical elastic body. A seal element of an oil seal mounted to an engine assembly makes contact with an outer circumferential surface of the boss. The hub 11 has a carbon equivalent of 0.5% or less, and a boss has a carbon equivalent of 0.5% or less and a carbon content of 0.2% or more. Induction hardening is applied to a portion of the boss with which the oil element makes contact.

2 Claims, 4 Drawing Sheets

TORSIONAL DAMPER

BACKGROUND OF THE INVENTION

The present invention relates to a torsional damper mounted to a crank shaft of an internal combustion engine.

A torsional damper is mounted to a crank shaft of an internal combustion engine in order to reduce a torsional vibration generated in the crank shaft. The torsional damper is generally mounted to a pulley portion with taking a mounting space into consideration.

FIG. 5 is across-sectional view showing a conventional torsional damper. In FIG. 5, a hub 2 is fixed to a crank shaft 1 in an internal combustion engine. This hub 2 has a cylindrical rim portion 2A extending in an axial direction and a fixing portion 2B integrally formed therewith and extending in a diametrical direction, and is formed by press-processing a sheet material. A surface of the fixing portion 2B makes contact with an end surface of the crank shaft 1. The hub 2 is fixed to the crank shaft 1 via a washer 6B by a bolt 6A screw-connected to a female screw 1A formed in the crank shaft 1.

A cylindrical mass body 3 made of metal is arranged in the outside of the rim portion 2A, and a cylindrical elastic body 4 made of a rubber or the like is fixed between the mass body 3 and the rim portion 2A by press-insertion or adhesion. An oil seal 5 is fixed to an engine assembly 20 in order to prevent lubricating oil from leaking out from the inside thereof, and a seal element of this makes contact with the outer circumferential surface of the crank shaft 1. A plurality of V-shaped grooves are formed on the outer circumferential surface of the mass body 3 to constitute a pulley, and this pulley is connected via a belt to an alternator, that is, a pulley of an alternating current generator or a pulley of a refrigerant compressor of an air conditioning equipment.

The crank shaft 1 mainly employs a medium carbon steel having a carbon content of 0.30 to 0.50%, or a high carbon steel having a carbon content of 0.50 to 0.80%, or an alloy steel. Since the crank shaft 1 made of the material as mentioned above has a high abrasion resistance on the outer circumferential surface thereof, it is possible to bring the seal element of the oil seal 5 into contact with the outer circumferential surface. The hub 2 made of a sheet metal mainly employs a low carbon steel or a very low carbon steel (having a carbon content of 0.30% or less).

FIG. 6 is a cross-sectional view showing another conventional torsional damper. A cylindrical spacer 7 having the inner circumferential surface 7A is fitted to an end portion of the crank shaft 1, and an end surface of the spacer 7 outward protrudes longer than the end surface of the crank shaft 1. The hub 2 made of a sheet metal is fixed to the crank shaft 1 by the bolt 6A, and the surface of the hub 2 makes contact with the end surface of the spacer 7.

In this torsional damper, the spacer 7 employs a medium carbon steel having a carbon content of 0.30 to 0.50%, or a high carbon steel having a carbon content of 0.50 to 0.80%, or an alloy steel. Since the spacer 7 made of the material as mentioned above has a high abrasion resistance, it is possible to bring the seal element of the oil seal 5 into contact with the outer circumferential surface thereof.

FIG. 7 is a cross-sectional view showing a still another conventional torsional damper. A boss 8 fitted to an end portion of the crank shaft 1 is firmly fixed to the hub 2 having the rim portion 2A and the fixing portion 2B, by welding. Reference numeral 10 denotes a weld portion. In order to easily perform the welding of the boss 8 to the hub 2, the boss 8 employs a low carbon steel or a very low carbon steel (in which a carbon content is 0.30% or less). In order to ensure an abrasion resistance to the seal element, a collar 9, to which a surface treatment such as chrome plating, induction hardening or the like is applied, is fitted to the outer circumferential surface of the boss 8.

SUMMARY OF THE INVENTION

In the torsional damper shown in FIG. 5, since the seal element of the oil seal 5 is directly brought into contact with the outer circumferential surface of the crank shaft 1, it is necessary to apply a surface hardening treatment to the outer circumferential surface and to smoothly flatten the outer peripheral surface with high accuracy. By doing so, the manufacturing cost of the torsional damper including the crank shaft is increased. Meanwhile, in the torsional damper shown in FIG. 6, since the seal element makes contact with the outer circumferential surface of the spacer 7, the spacer 7 must be made of a member having a high abrasion resistance and additionally the number of parts constituting the torsional damper is increased so that the assembling efficiency is reduced. Further, as shown in FIGS. 5 and 6, since the hub 2 is fixed to the crank shaft 1 in a state that the fixing portion 2B at the center of the hub 2 makes contact with the end surface of the crank shaft 1 or the end surface of the spacer 7, it is impossible to enhance the fixing strength of the hub 2.

On the contrary, in the torsional damper shown in FIG. 7, since the hub 2 is welded to the boss 8, the fixing strength of the hub 2 becomes high. However, the collar 9 having a high abrasion resistance must be fitted to the outside of the boss 8, and therefore such an operation is required that the collar 9 which is another part different from the boss 8 is press-inserted into the boss 8. As a result, the number of parts thereof is increased, and further the manufacturing cost becomes high.

In order to eliminate use of this collar 9, if a medium carbon steel having a carbon content of 0.30 to 0.50% or a high carbon steel having a carbon content of 0.50 to 0.80% is used as a material of the boss 8, then the weld portion 10 between the boss 8 and the hub 2 is hardened and the strength is lowered due to reduction in toughness and increase in residual stress. In order to remove this thermal influence, the weld portion 10 must be thermally treated. Accordingly, in order to manufacture the torsional damper shown in FIG. 7, three steps, that is, a welding step, a tempering step of the weld portion, and an induction-hardening step of induction-hardening a portion with which the seal element makes contact, are required, so that there arises the problem that the manufacturing cost of the torsional damper becomes high.

An object of the present invention is to provide a torsional damper having high assembly efficiency with respect to a crank shaft.

Another object of the present invention is to provide a torsional damper that can obtain weld strength desired without thermally treating the weld portion between a hub and a boss welded thereto.

Sill anther object of the present invention is to provide a torsional damper in which a portion with which a seal element makes contact has high abrasion resistance.

The torsional damper according to the present invention is a torsinoal damper mounted to a crank shaft of an internal combustion engine, and is characterized by a cylindrical metal boss fitted to the crank shaft and having an outer circumferential surface with which an oil seal provided in an engine assembly makes contact; a hub which has a fixing portion welded to an end surface of the boss and a cylindrical rim portion integrally and concentrically formed in an outer circumferential side of the fixing portion, and which is formed by a sheet metal or a cold forging operation; a cylindrical mass body concentrically arranged in an outer side of the rim portion; and a cylindrical elastic body provided between the rim portion and the mass body, wherein a metal material of the hub has a carbon equivalent of 0.5% or less; a metal material of the boss has a carbon equivalent of 0.5% or less and a carbon content of 0.2% or more; and a portion making contact with the oil seal is quench-hardened. A portion of the hub making contact with the oil seal of said hub may be induction-hardened.

The boss fitted to the crank shaft is welded to the fixing portion of the hub according to the present invention. As a result that the inventors have devoted themselves to research and development and trial manufacture, the fact has found out that when the carbon equivalent (Ceq) of the hub exceeds 0.5%, the weld strength (a boss pull-out force) of the boss is lowered and further the required hardness (HRC) of the portion with which the seal element of the oil seal makes contact is about 40 (HRC) and so the carbon content (C) of the portion to be induction-hardened requires 0.2% or more. The present invention is based on the knowledge mentioned above.

DESCRIPTION OF THE PREFERRED EMBODIMENTS

Figure 1:
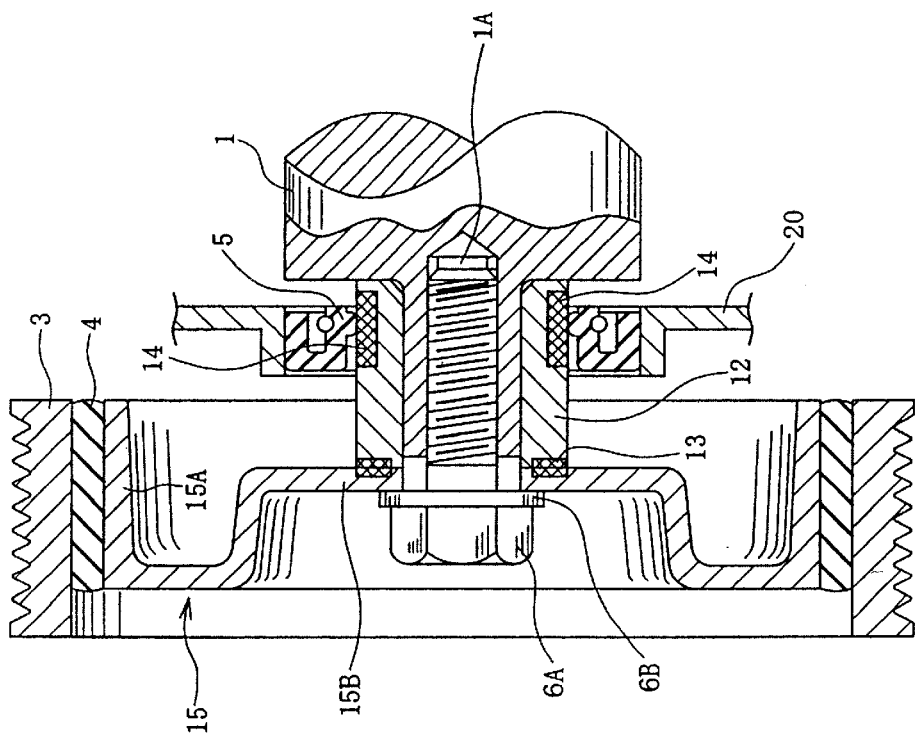
FIG. 1 is a cross-sectional view showing an embodiment of a torsional damper according to the present invention.

As shown in FIG. 1, a torsional damper according to the present invention has a hub 11 made of a sheet metal. The hub 11 is provided with a rim portion 11A substantially formed in a cylindrical shape, and a fixing portion 11B integrally formed with the rim portion 11A and extending in a diametrical direction. The hub 11 is made of a sheet metal and is formed by press-processing a plate-shaped material. A through hole is formed in the fixing portion 11B, and the hub 11 is firmly fixed to a crank shaft 1 via a washer 6B by a bolt 6A screw-connected to a female screw 1A which passes through the through hole and which is formed in the crank shaft 1. A material of the hub 11 is a carbon equivalent (Ceq) of 0.5% or less.

A cylindrical metal boss 12 is fitted to the outside of the crank shaft 1. An end surface of the boss 12 is firmly and integrally fixed to the fixing portion 11B of the hub 11 by welding. In FIG. 1, reference numeral 13 denotes a weld portion. A material of the boss 12 is a carbon equivalent (Ceq) of 0.5% or less, and a carbon content (C) of 0.2% or more.

An oil seal 5 is mounted to an engine assembly 20 so that a seal element makes contact with the outer circumferential surface of the boss 12, and induction hardening is applied to a portion of the boss 12 with which the oil seal makes contact. In FIG. 1, reference numeral 14 denotes a portion to which the induction hardening is applied.

As described above, the torsional damper has the hub 11 integrally molded by press-processing a metal sheet material which has a carbon equivalent (Ceq) of 0.5% or less, and the boss 12 formed by a metal material which has a carbon equivalent (Ceq) of 0.5% or less and a carbon content (C) of 0.2% or more, and the boss 12 is welded to the hub 11 at the weld portion 13.

Figure 3:
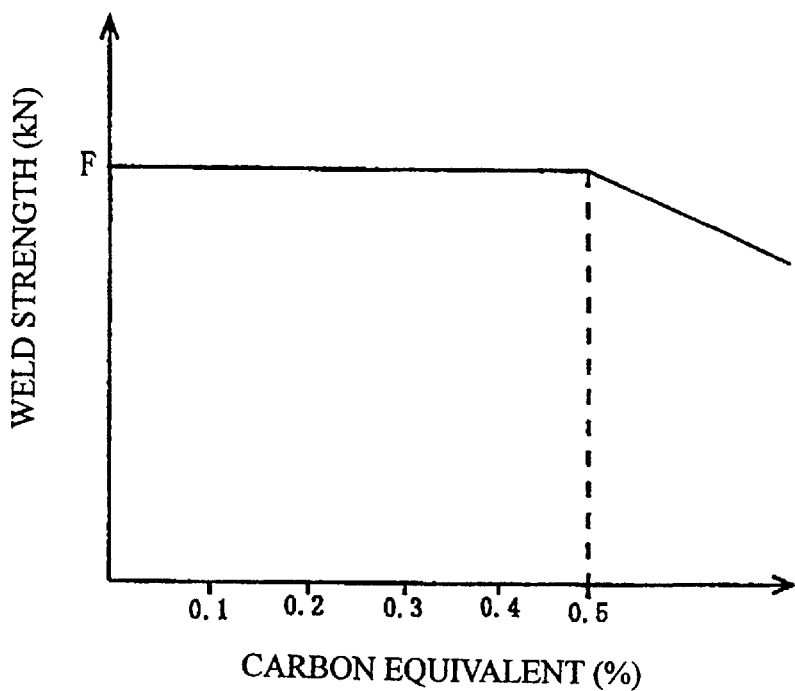
FIG. 3 is a characteristic graph showing the relation between the carbon equivalent (%) and the weld strength (kN) in a metal material at the time of welding.
Figure 4:
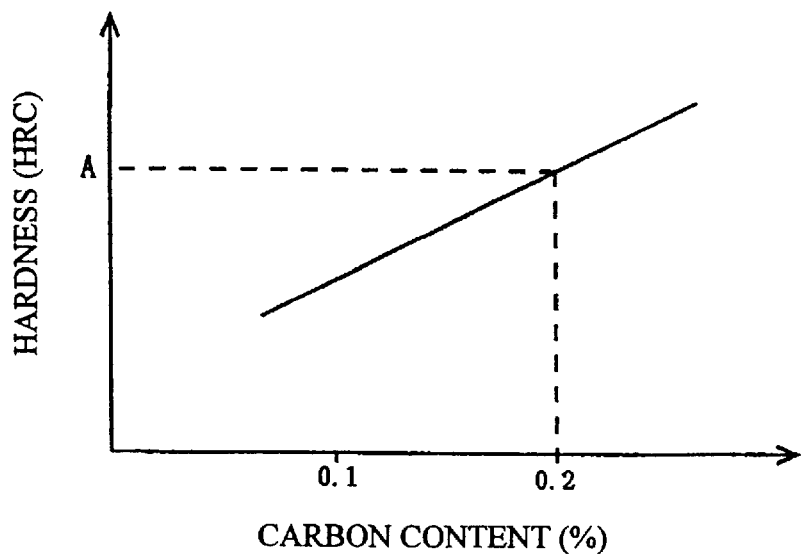
FIG. 4 is a characteristic graph showing the relation between the carbon content (%) and the hardness (HRC) in a metal material at the time of induction hardening.
Figure 5:
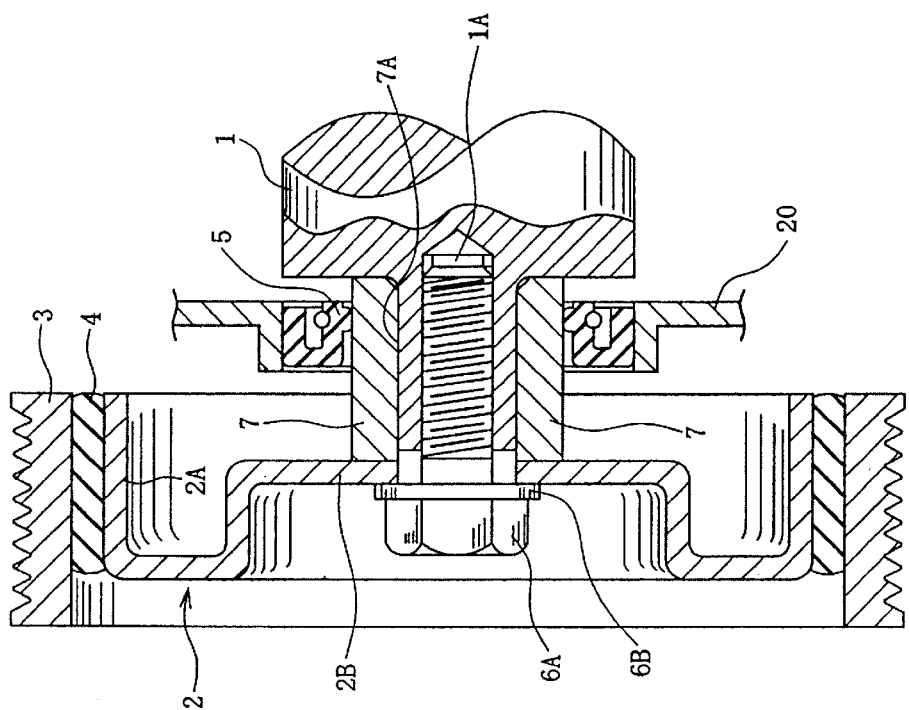
FIG. 5 is a cross-sectional view showing a conventional torsional damper.
Figure 6:
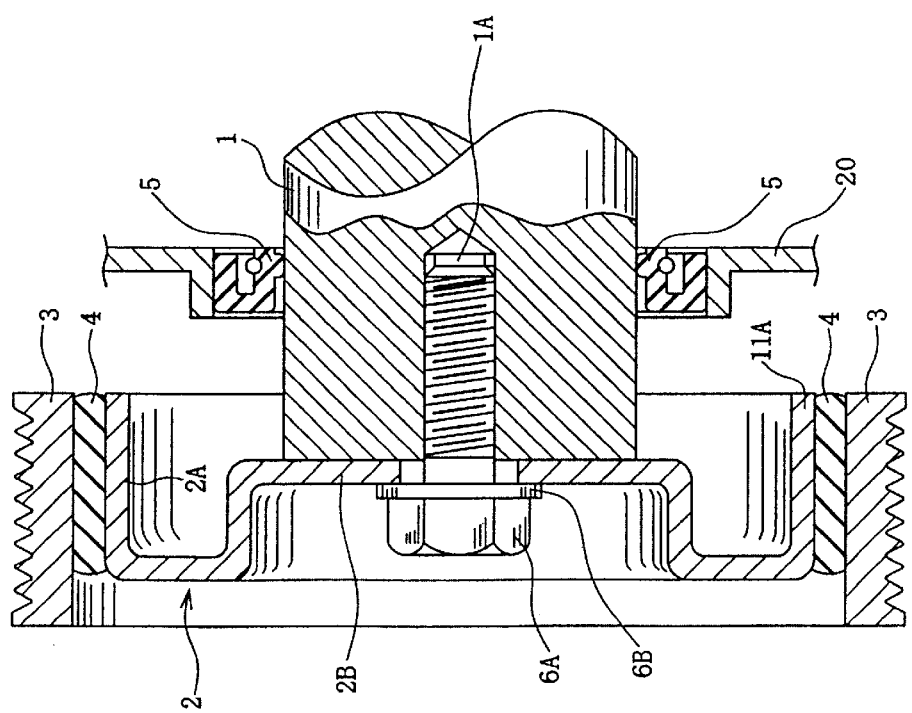
FIG. 6 is a cross-sectional view showing another conventional torsional damper.
Figure 7:
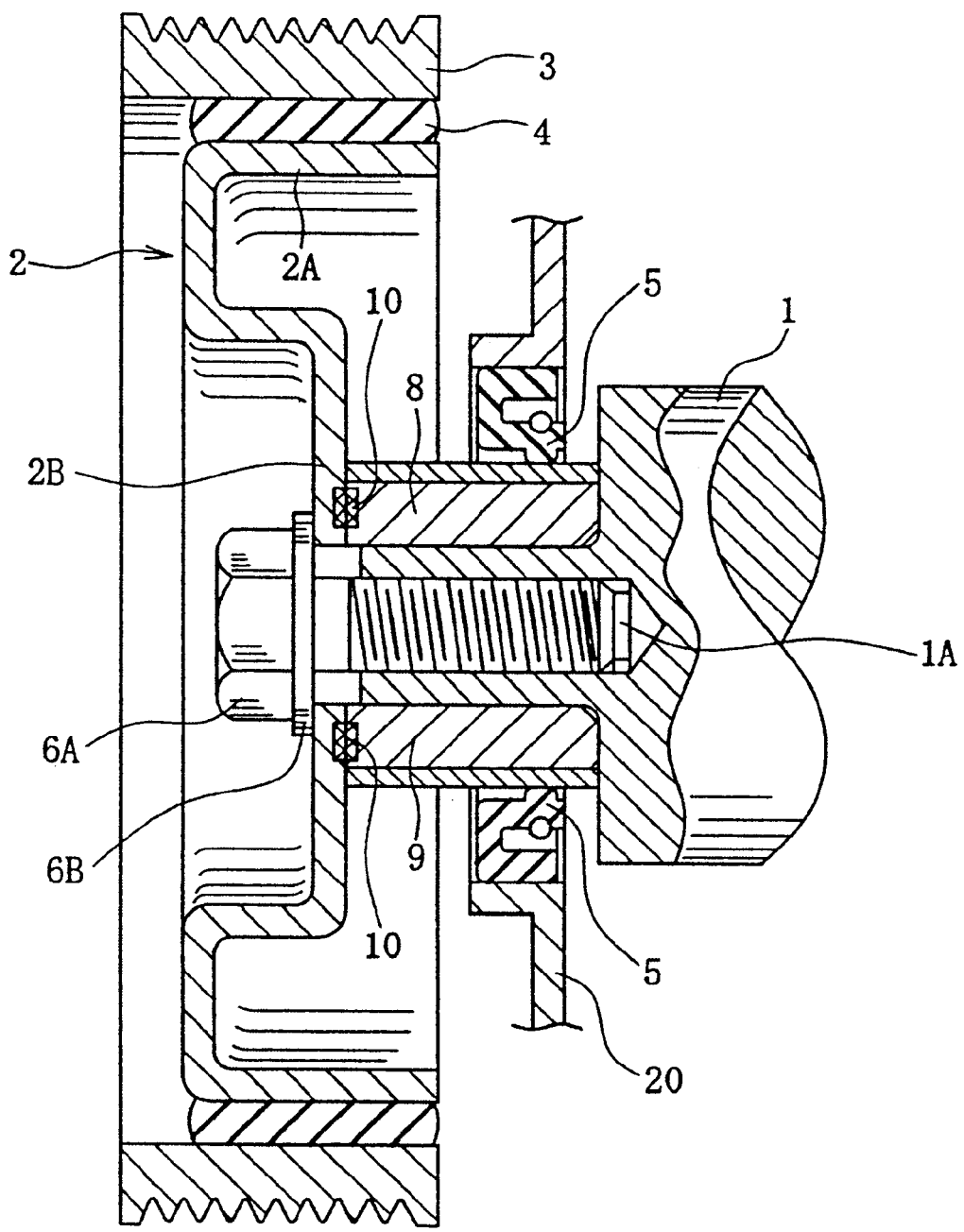
FIG. 7 is a cross-sectional view showing still another conventional torsional damper.

As shown in FIG. 3, when a carbon equivalent (Ceq) of a member to be welded exceeds 0.5%, the weld strength is reduced. Meanwhile, as shown in FIG. 4, the required hardness of the portion with which this seal element makes contact is about 40 (HRC), and such a carbon content (C) that the hardness can be obtained by induction hardening is 0.2% or more.

Accordingly, the weld portion 13 can keep a sufficient weld strength F (boss pull-out force) as shown in FIG. 3 without applying any heat treatment such as a tempering treatment or the like. Further, the induction hardening can be applied to the outer circumferential surface of the metal boss 12, and the required hardness of about 40 (HRC) can be obtained as shown in FIG. 4, and an abrasion resistance of the oil seal portion can be also satisfied. Therefore, it is possible to directly bring the oil seal 5 into contact therewith. In this case, hardness A shown in FIG. 4 corresponds to a value of the required hardness of the portion with which the oil seal 5 directly makes contact on the outer circumferential surface of the metal boss 12.

Figure 2:
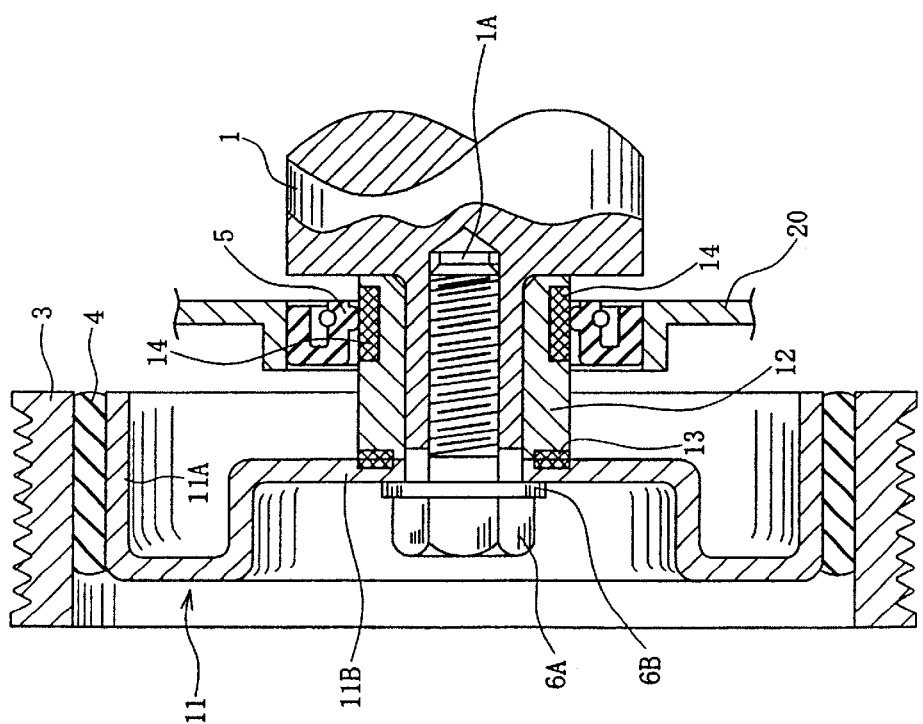
FIG. 2 is a cross-sectional view showing another embodiment of a torsional damper according to the present invention.

FIG. 2 is a cross-sectional view showing another embodiment of a torsional damper according to the present invention. A hub 15 of this torsional damper is manufactured by using a material having a carbon equivalent (Ceq) of 0.5% or less, and by cold forging. The hub 15 includes a fixing portion 15B having a through hole through which a bolt 6A screw-connected to the crank shaft 1 passes, and a rim portion 15A concentrically formed in an outer circumferential side thereof, and the hub 15 is firmly fixed to the crank shaft 1 at the fixing portion 15B. In FIG. 2, members common to the members shown in FIG. 1 have the same reference numerals.

According to the torsional damper that is the present invention shown in FIGS. 1 and 2, it is possible to keep a sufficient weld strength, that is, a boss pull-out force without applying any heat treatment to the weld portion between the fixing portion and the boss after welding. Further, it is possible to apply induction hardening to the outer circumferential surface of the boss, and at the same time satisfy also an abrasion resistance of the oil seal. Additionally, since the number of parts used can be reduced, the manufacturing cost price can be reduced and good assembly efficiency can be obtained.

What is claimed is:

1. A torsionsal damper mounted to a crank shaft of an internal combustion engine, comprising:

a cylindrical metal boss fitted to said crank shaft and having an outer circumferential surface with which an oil seal provided in an engine assembly makes contact;

a hub which has a fixing portion welded to an end surface of said boss and a cylindrical rim portion integrally and concentrically formed in an outer circumerential side of the fixing portion, and which is formed by one of a sheet metal and a cold forging operation;

a cylindrical mass body concentrically arranged in an outer side of said rim portion; and a cylindrical elastic body provided between said rim portion and said mass body, wherein a metal material of said hub is set to have a carbon equivalent of 0.5% or less and a metal material of said boss is set to have a carbon equivalent of 0.5% or less and a carbon content of 0.2% or more so that no heat treatment need be applied to the weld portion between said fixing portion and said boss after welding, and a portion making contact with the oil seal is quenched-hardened.

2. A torsional damper mounted to a crank shaft of an internal combustion engine, comprising:

a cylindrical metal boss fitted to said crank shaft and having an outer circumferential surface with which an oil seal provided in an engine assembly makes contact;

a hub which has a fixing portion welded to an end surface of said boss and a cylindrical rim portion integrally and concentrically formed in an outer circumferential side of the fixing portion, and which is formed by one of a sheet metal and a cold forging operation;

a cylindrical mass body concentrically arranged in an outer side of said rim portion; and a cylindrical elastic body provided between the rim portion and said mass body, wherein a metal material of said hub is set to have a carbon equivalent of 0.5% or less and a metal material of said boss is set to have a carbon equivalent of 0.5% or less and a carbon content of 0.2% or more so that no heat treatment need be applied to the weld portion between said fixing portion and said boss after welding, and a portion making contact with the oil seal of said hub is induction-hardened.

\* \* \* \* \*